US011905112B2

(12) United States Patent
Ford

(10) Patent No.: US 11,905,112 B2
(45) **Date of Patent: *Feb. 20, 2024**

(54) BIASING CRADLE FOR REFUSE VEHICLE

(71) Applicant: The Heil Co., Chattanooga, TN (US)

(72) Inventor: Richard Ford, Ringgold, GA (US)

(73) Assignee: The Heil Co., Chattanooga, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,544

(22) Filed: Aug. 1, 2022

(65) Prior Publication Data

US 2023/0019685 A1 Jan. 19, 2023

Related U.S. Application Data

(63) Continuation of application No. 17/001,196, filed on Aug. 24, 2020, now Pat. No. 11,427,402, which is a continuation of application No. 15/906,025, filed on Feb. 27, 2018, now Pat. No. 10,752,438, which is a continuation of application No. 14/043,367, filed on Oct. 1, 2013, now Pat. No. 9,926,134.

(51) Int. Cl.
*B65F 3/04* (2006.01)
*B65F 3/02* (2006.01)

(52) U.S. Cl.
CPC ...... *B65F 3/041* (2013.01); *B65F 2003/0279* (2013.01)

(58) Field of Classification Search
CPC ......................... B65F 3/041; B65F 2003/0279
See application file for complete search history.

(56) References Cited

U.S. PATENT DOCUMENTS

| | | | |
|---|---|---|---|
| 2,643,011 | A | 6/1953 | Brisson et al. |
| 2,784,853 | A | 3/1957 | Bowles |
| 2,824,655 | A | 2/1958 | Harbers |
| 3,090,512 | A | 5/1963 | Dempster et al. |
| 3,112,834 | A | 12/1963 | Dempster et al. |
| 3,202,305 | A | 8/1965 | Dempster et al. |
| 4,547,118 | A | 10/1985 | Pittenger |
| 5,266,000 | A | 11/1993 | LeBlanc, Jr. |
| 5,388,950 | A | 2/1995 | Schmahl et al. |

(Continued)

FOREIGN PATENT DOCUMENTS

GB 1020376 2/1996

OTHER PUBLICATIONS

Extended European Search Report in European Appln. No. 14176728.5, dated Mar. 3, 2015, 7 pages.

(Continued)

*Primary Examiner* — Saul Rodriguez
*Assistant Examiner* — Ashley K Romano
(74) *Attorney, Agent, or Firm* — Fish & Richardson P.C.

(57) ABSTRACT

A cradle and guide system for a refuse vehicle has at least one track member mounted on a bumper of a refuse vehicle. The at least one track member is able to deflect horizontally to compensate for misalignment. At least one guide member is mounted to a front loading fork of the refuse vehicle. The at least one guide member contacts the at least one track member to limit horizontal movement of the front loading fork with respect to the refuse vehicle during misalignment. The at least one track member returns to its original position to align the front loading forks.

23 Claims, 11 Drawing Sheets

(56) References Cited

U.S. PATENT DOCUMENTS

| | | | |
|---|---|---|---|
| 5,720,588 | A | 2/1998 | Graves |
| 5,769,592 | A | 6/1998 | Christenson |
| 6,224,317 | B1 | 5/2001 | Kann et al. |
| 6,709,220 | B2 | 3/2004 | Yakley et al. |
| 6,951,328 | B1 | 10/2005 | Drapeau et al. |
| 7,210,890 | B2 | 5/2007 | Curotto et al. |
| 7,390,159 | B2 | 6/2008 | Rimsa et al. |
| 7,633,020 | B2 | 12/2009 | Santi et al. |
| 8,092,141 | B2 | 1/2012 | Curotto et al. |
| 8,496,427 | B2 | 7/2013 | Curotto et al. |
| 8,534,977 | B2 | 9/2013 | Rowland et al. |
| 8,550,764 | B2 | 10/2013 | Rowland et al. |
| 8,584,362 | B2 | 11/2013 | Mezera et al. |
| 8,647,041 | B2 | 2/2014 | Ummel, Jr. |
| 9,926,134 | B2 | 3/2018 | Ford |
| 10,752,438 | B2 | 8/2020 | Ford |
| 11,427,402 | B2 | 8/2022 | Ford |
| 2005/0095096 | A1 | 5/2005 | Curotto et al. |
| 2010/0183410 | A1 | 7/2010 | Curotto |
| 2010/0278620 | A1 | 11/2010 | Rimsa |
| 2013/0022431 | A1 | 1/2013 | Goedken et al. |
| 2013/0195590 | A1* | 8/2013 | Goedken ................. B65F 3/041 414/408 |
| 2013/0243554 | A1 | 9/2013 | Rowland et al. |
| 2013/0266407 | A1 | 10/2013 | Curotto et al. |
| 2013/0322994 | A1 | 12/2013 | Curotto et al. |
| 2014/0341685 | A1 | 11/2014 | Ford |
| 2015/0093222 | A1 | 4/2015 | Ford |
| 2015/0307274 | A1 | 10/2015 | O'Riordan et al. |
| 2017/0349375 | A1* | 12/2017 | Hund, Jr. .................. B65F 3/04 |
| 2018/0251295 | A1 | 9/2018 | Ford |
| 2018/0327183 | A1* | 11/2018 | Peek ....................... E01H 5/061 |
| 2021/0214157 | A1 | 7/2021 | Ford |

OTHER PUBLICATIONS

Office Action in Canadian Appln. No. 2,852,554, dated Aug. 3, 2020, 6 pages.

Office Action in Canadian Appln. No. 2,852,554, dated Jun. 15, 2021, 3 pages.

* cited by examiner

BIASING CRADLE FOR REFUSE VEHICLE

CROSS-REFERENCE TO RELATED APPLICATIONS

This application is a continuation of U.S. patent application Ser. No. 17/001,196 filed on Aug. 24, 2020, which is a continuation of U.S. patent application Ser. No. 15/906,025 filed on Feb. 27, 2018, now United Statement Pat. No. 10,752,438, which is a continuation of U.S. patent application Ser. No. 14/043,367 filed on Oct. 1, 2013, now U.S. Pat. No. 9,926,134. The entire disclosure of the above applications are incorporated herein by reference.

FIELD

The present disclosure relates to refuse vehicles and, more particularly, to refuse vehicles with front loading forks with a biasing cradle.

BACKGROUND

When picking up residential, as well as commercial refuse, refuse haulers attempt to maximize their refuse vehicle potential. Refuse vehicles with front fork loading forks can be utilized to pick up large intermediate containers at commercial buildings. Additionally, these types of vehicles can be utilized to receive residential refuse at the rear of the vehicle. Recently, intermediate containers that include garbage can gripping devices that are maintained on the front loading forks have become more popular for picking up residential refuse. These intermediate containers include a self-contained arm that extends from the intermediate container to grasp a garbage can and dump the garbage can in the intermediate container. Once the intermediate container is full, the front loading forks dump the intermediate container into the hopper of the large permanent container on the vehicle.

While using these intermediate containers with a grasping arm, it has been found that as the arm extends from the intermediate container, due to the fast cycle time, that substantial horizontal movement is created in the front loading forks. The further the arm extends from the intermediate container, the more likely horizontal movement of the front loading forks is to occur. The horizontal motion causes increased stress on the front loading forks which were originally designed to handle vertical forces from the operation of commercial container dump cycles. Accordingly, it would be desirous to prohibit horizontal movement of the front loading forks during pick up of residential refuse while utilizing a front loading intermediate container with a self-contained gripping arm.

The present disclosure provides the art with a refuse vehicle that substantially prohibits movement of the front loading forks when utilizing an intermediate container during residential pick up. The present disclosure enables vertical movement of the intermediate container to adjust for garbage can height while prohibiting horizontal movement of the front loading forks. Additionally, the disclosure provides a simple and economical biasing cradle system that can be attached to an existing refuse vehicles or can be original manufacturer's equipment.

SUMMARY

Accordingly to a first aspect of the disclosure, a cradle system for refuse vehicle comprises at least one track member. The track member is mounted on a bumper of a refuse vehicle. The at least one track member has a desired length extending transverse to the ground. At least one track member is able to deflect horizontally to compensate for misalignment. At least one guide member is mounted on the front loading fork of the refuse vehicle. The at least one guide member contacts the at least one track member to limit horizontal movement of the front loading forks with respect to the refuse vehicle during misalignment. The at least one track member applies a force to the at least one guide member to return the at least one track member to its original position to align the front loading forks. The guide member or track member could be integrated into the container along any point. Thus, one or multiple guides/tracks can be utilized to interact with and mate on the bumper. A wear pad is positioned on one of the track members or the guide members. The track member includes a deflection member and a stationary member. A biasing mechanism enables the deflection and return of the deflecting member. The deflecting member may be manufactured from spring steel and have an L-shaped with one of the legs welded to the stationary member. Additionally, the biasing mechanism may include at least one spring mechanism positioned between the deflecting member and the stationary member. A pivot is positioned at the bottom of the deflection member. Alternatively, the biasing mechanism includes a pair of spring members positioned between the deflecting member and the stationary member. The biasing member alternatively may include a U-shape member with at least one leg secured to the stationary member. The U-shape member may be inverted 90° or 180°.

According to a second aspect of the disclosure, a refuse vehicle comprises a vehicle chassis and cab. A permanent container is coupled with the rear portion of the chassis. Front loading forks are coupled with the refuse vehicle to dump an intermediate container into the permanent container on the rear of the chassis. The track member is mounted on a bumper of a refuse vehicle. The at least one track member has a desired length extending transverse to the ground. At least one track member is able to deflect horizontally to compensate for misalignment. At least one guide member is mounted on the front loading fork of the refuse vehicle. The at least one guide member contacts the at least one track member to limit horizontal movement of the front loading forks with respect to the refuse vehicle during misalignment. The at least one track member applies a force to the at least one guide member to return the at least one track member to its original position to align the front loading forks. A wear pad is positioned on one of the track members or the guide members. The track member includes a deflection member and a stationary member. A biasing mechanism enables the deflection and return of the deflecting member. The deflecting member may be manufactured from spring steel and have an L-shaped with one of the legs welded to the stationary member. Additionally, the biasing mechanism may include at least one spring mechanism positioned between the deflecting member and the stationary member. A pivot is positioned at the bottom of the deflection member. Alternatively, the biasing mechanism may include a pair of spring members positioned between the deflecting member and the stationary member. The biasing mechanism may alternatively include a U-shape member with at least one leg secured to the stationary member. The U-shape member may be inverted 90° or 180°.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
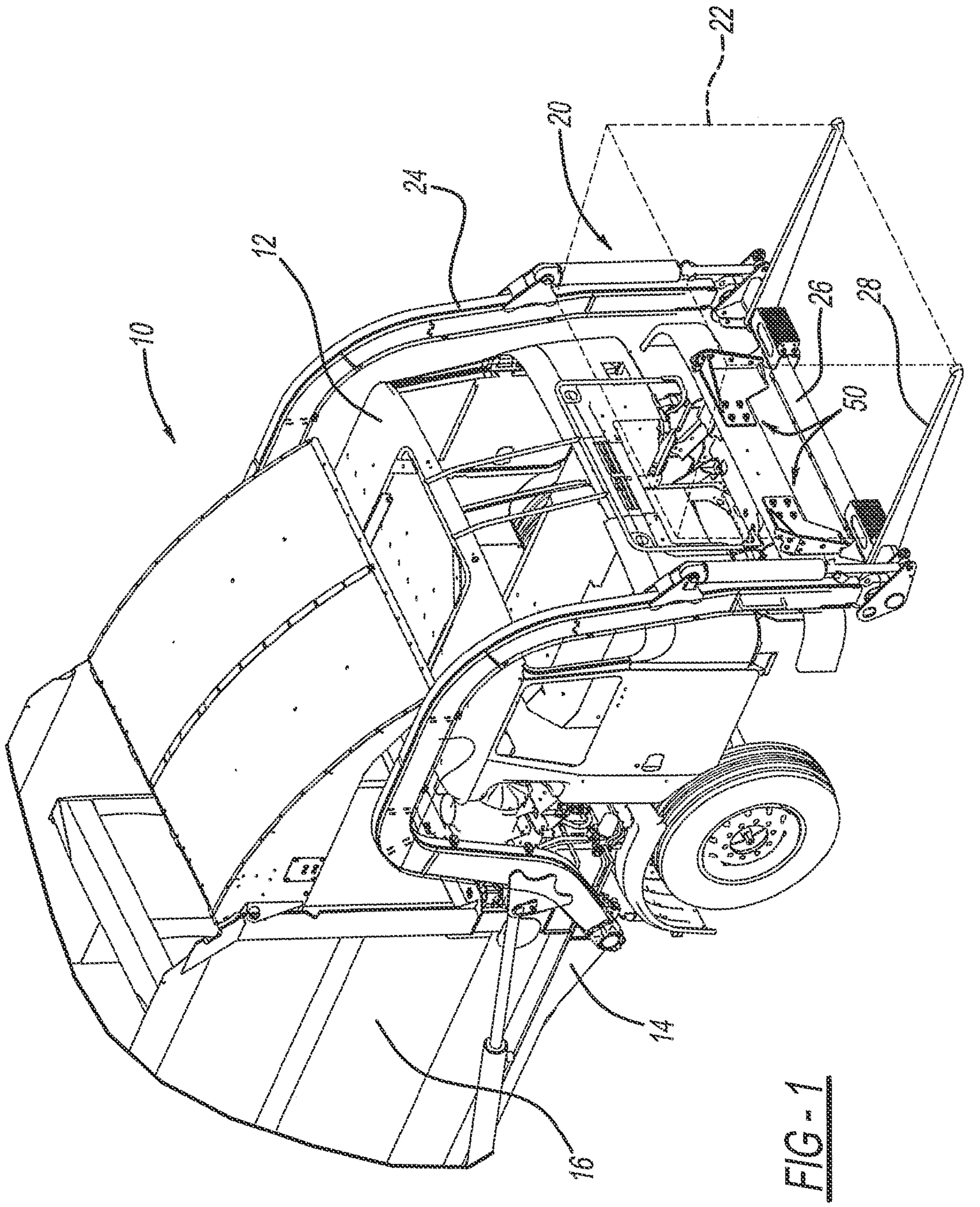
FIG. 1 is a perspective view of a first embodiment of a biasing cradle assembly.

Turning to the figures, particularly FIG. 1, a refuse vehicle is illustrated and designated with the reference numeral 10. The refuse vehicle 10 includes a chassis 12 with a cab 14 and a permanent rear container 16 positioned onto the rear of the chassis. The refuse vehicle 10 also includes front loading forks 20. The front loading forks 20 dump intermediate container 22 into the rear container 16. The forks 20 include a pair of side bars 24, a cross-bar 26 and tines 28. The front loading forks 20 dump the intermediate container 22 positioned on the tines 28 in a conventional manner. The intermediate container 22 includes an arm 30 with a gripper 32. The arm 30 extends and retracts into the intermediate container 22 to grasp and then dump a garbage can 36 into the intermediate container 22.

Figure 2:
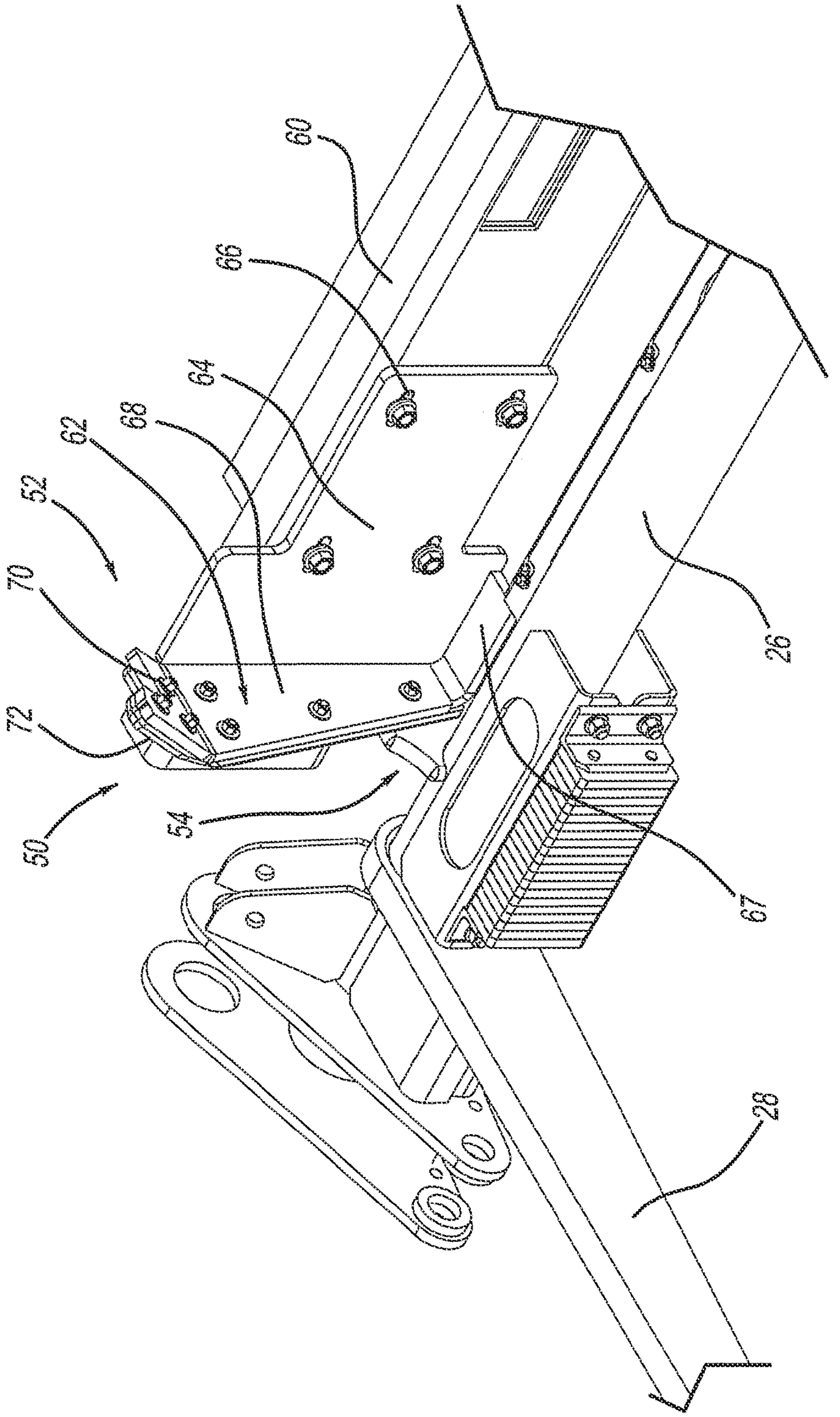
FIG. 2 is a front perspective view of the cradle assembly of FIG. 1.

Turning to FIG. 2, a cradle and guide system is illustrated and designated with the reference numeral 50. The cradle and guide system 50 includes a track or cradle member 52 and a guide member 54. The cradle 52 and guide member 54 are positioned on the left side of the vehicle bumper 60. Additionally, a second cradle and guide member may be positioned on the other side of the bumper. The cradle member 52 and guide member 54 would be identical and would be positioned on either side of the vehicle. While the track or cradle member 52 is shown on the bumper and the guide member 54 is shown on the fork cross bar 26, it should be understood that the guide member 54 may be on the bumper and the track 52 on the fork cross bar 26.

The track or cradle member 52 includes a deflectable portion 62 and a stationary portion 64. The deflectable portion 62 is welded or the like to the stationary portion 64. The stationary portion 64 is bolted or the like to the bumper 60 of the vehicle 10. The stationary portion 64 can take any shape and is shown with a T-shape with slots 66 to receive bolts to secure with the bumper. The deflectable portion 62 has an overall L-shape. The horizontal leg 67 of the L is welded to the top of the T-shape stationary member 64 at the bottom of the bumper. Also, a space is formed between the deflectable portion 62 and the stationary portion 64 so that the deflectable portion 62 may deflect a desired amount. The vertical leg 68 of the L-shape deflectable portion 62 has a top with an angled end 70. A wear plate 72 is positioned on the outside of the vertical leg 68 and angled end 70 of the L-shape deflectable member.

The guide member 54 is coupled with the cross support 26. The guide member 54 is a plate having a desired configuration. The plate generally has an overall rectangular configuration and is shaped a desired amount forming a gap between the L-shaped deflectable member 62. The plate 54 may also include a wear plate or the like.

Figure 3:
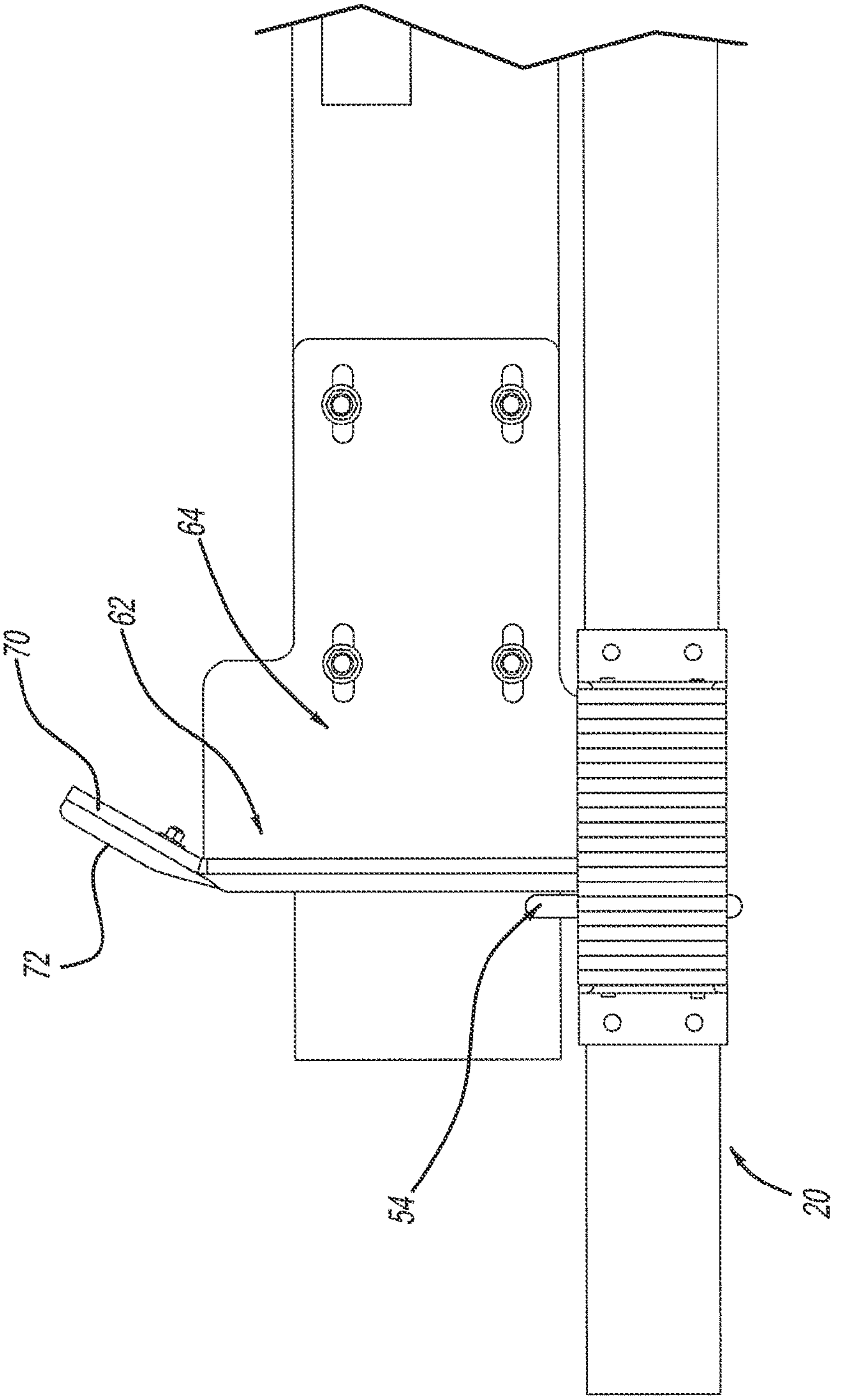
FIG. 3 is a front plan view of the cradle assembly of FIG. 1.

As can be seen in FIG. 3, the gap is provided between the guide member 54 and the cradle 52. As vertical movement occurs in the forks, the guide plate 54 contacts the deflectable portion 62. The deflectable portion 62 deflects and reacts to force to move the fork back into its original position. When the front loader has been dump and it is returning to its down position, the angled end 70 acts as a chamfer to move the fork 20 into its original position. Even if the end is deflected, the deflectable portion 62 applies a force onto the fork 20 to maintain it into its original position. Thus, if the forks are out of horizontal position when in contact with the cradle 52, the cradles 52 will assert a force onto the guide member 54 to attempt to force the forks 20 into its original position.

Figure 4:
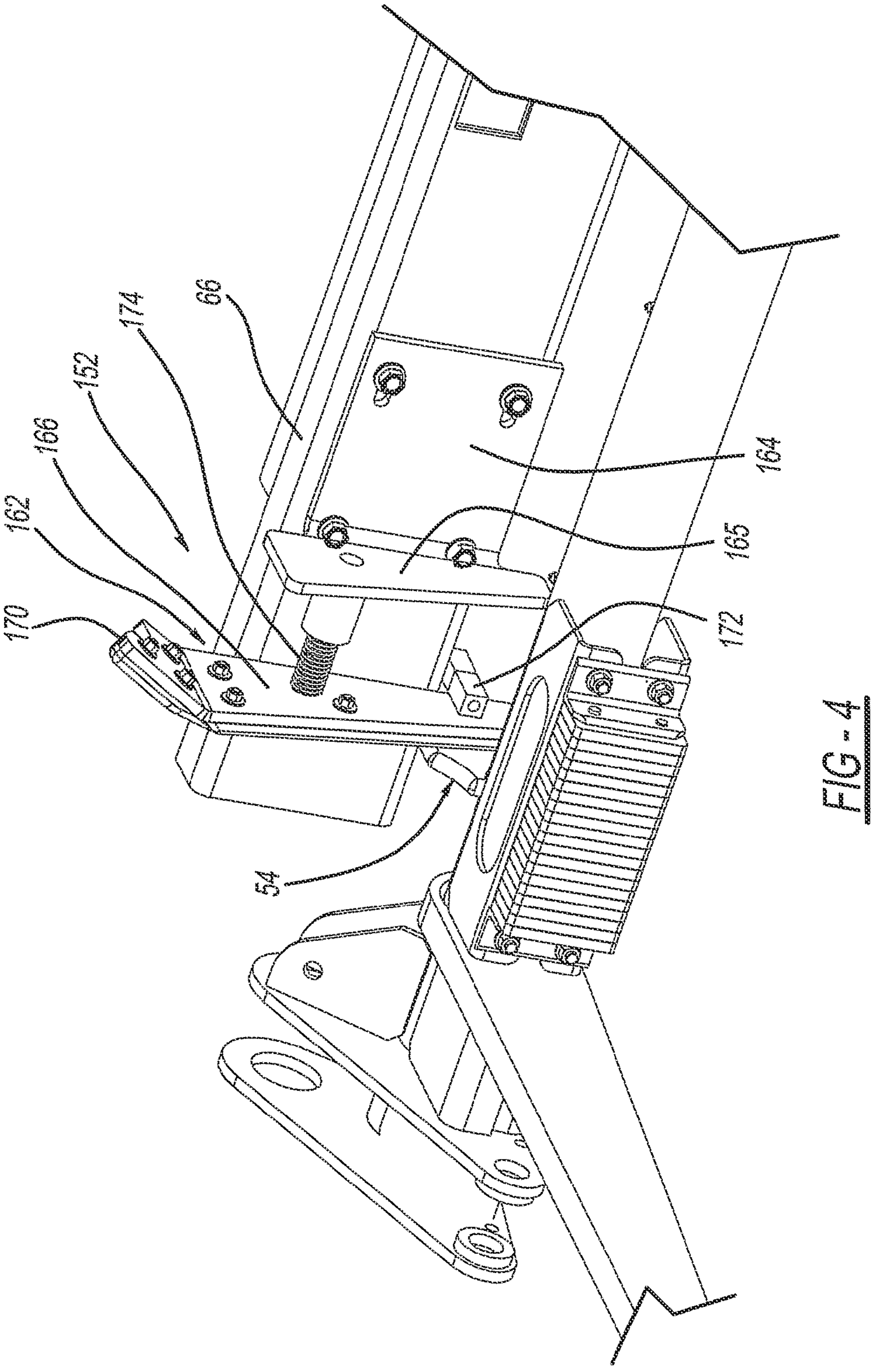
FIG. 4 is a front perspective of a second embodiment of a cradle assembly.

Turning to FIG. 4, an additional embodiment of the cradle assembly is illustrated. Components that are the same are identified with the same reference numerals.

The cradle 152 includes a plate 162 with a deflectable vertical leg 166 and an angled end 170 continuous with the vertical leg 166. Also, a wear plate 72 is applied to the vertical leg 166 and the angled end 170. A pivot point 172 is positioned towards the end of the vertical leg 166 to enable the deflectable cradle 152 to move horizontally. Also, a biasing spring 174 is positioned between the deflectable member 166 and the stationary member 164. The stationary member 164 includes an upturned portion 165 that is biased against the spring 174. Thus, as the guide plate 56 moves against the deflectable portion 162 of the cradle 152, the spring 174 enables the deflectable portion 162 to deflect towards the stationary member 164. Additionally, the force of the spring is always applying a return force to the guide plate 54 to return the forks 20 to their original position.

Figure 5:
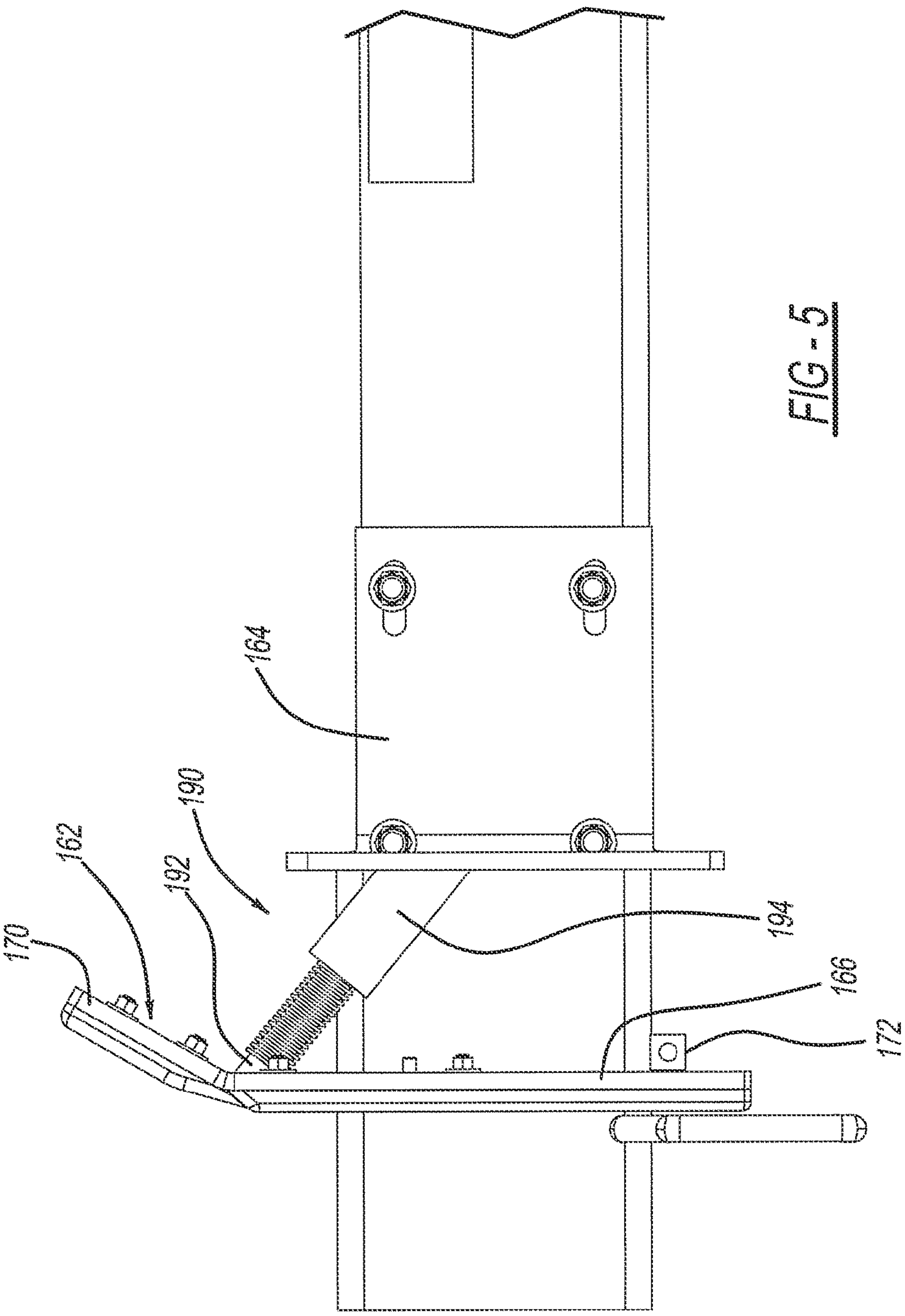
FIG. 5 is an additional embodiment of a cradle assembly.

Turning to FIG. 5, an additional embodiment is shown. Here, the difference between FIGS. 4 and 5 is in the spring member. The spring member 190 is a piston type with a movable rod 192 positioned at the apex of the vertical leg 166 and the angled end portion 170. Thus, as the guide member 54 moves the deflectable portion 162, the piston rod member 192 slides into the cylinder 194 to enable the deflectable portion 162 to move with respect to the stationary portion 164.

Figure 6:
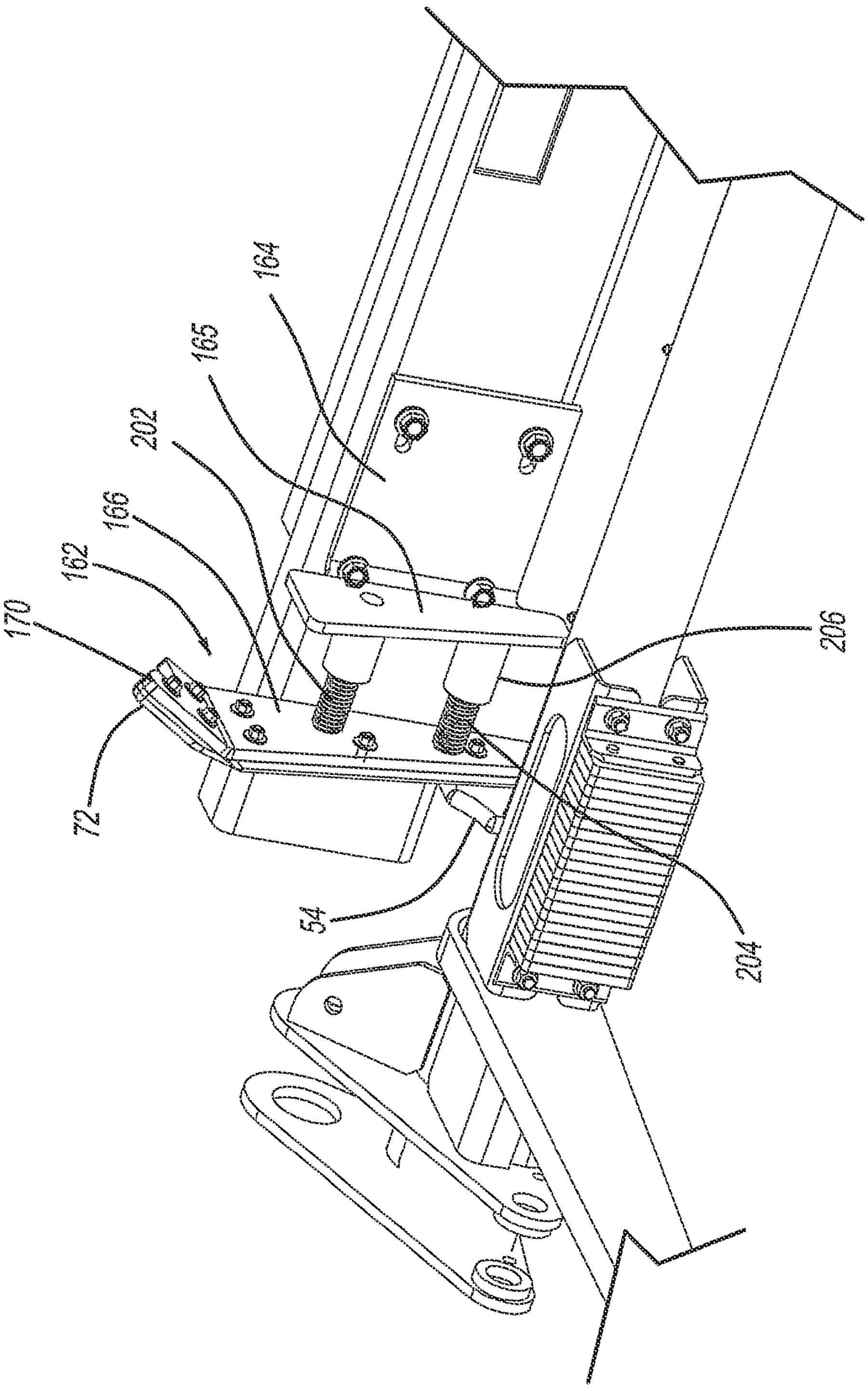
FIG. 6 is a front perspective view of an additional cradle assembly.
Figure 7:
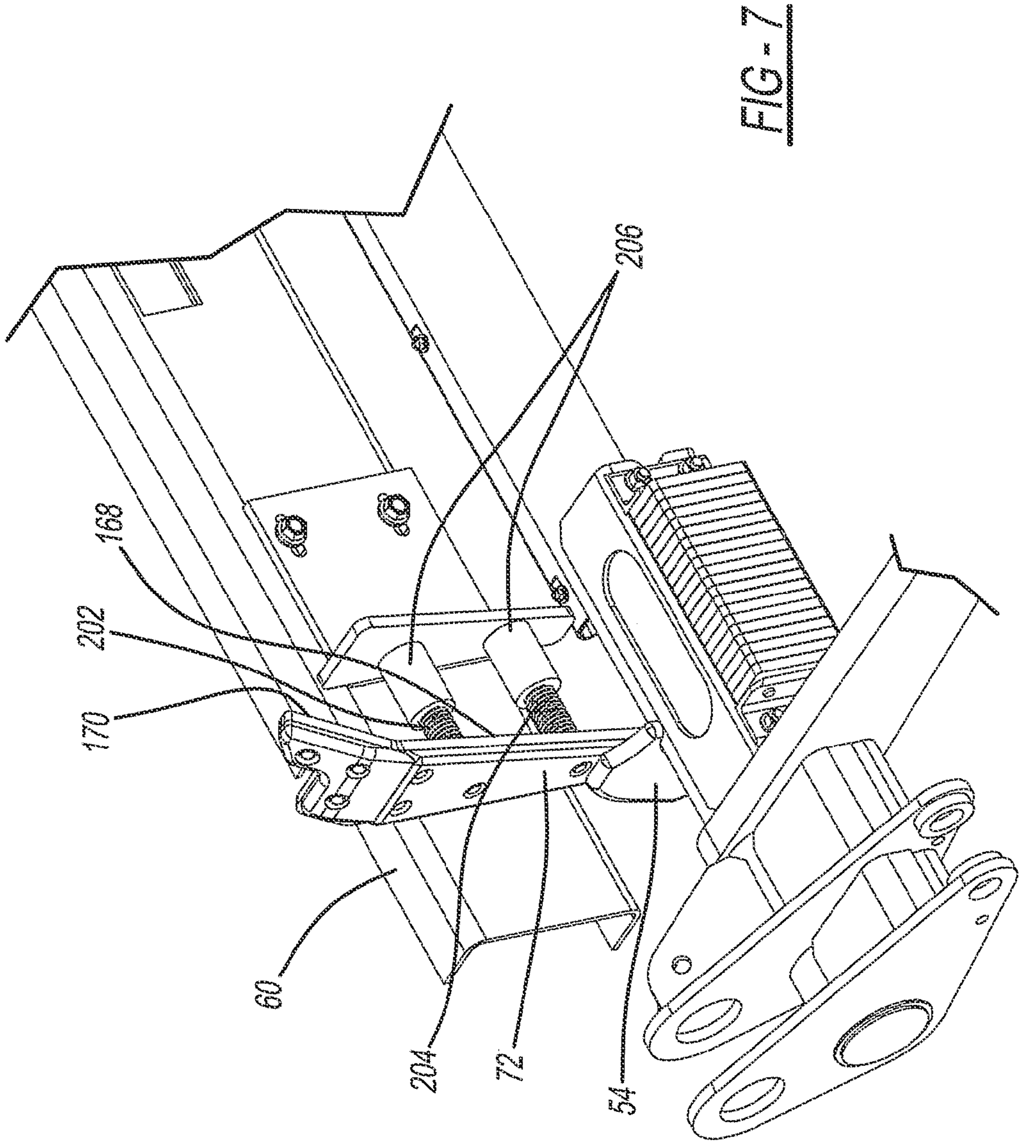
FIG. 7 is a perspective view of the cradle assembly of FIG. 6.
Figure 8:
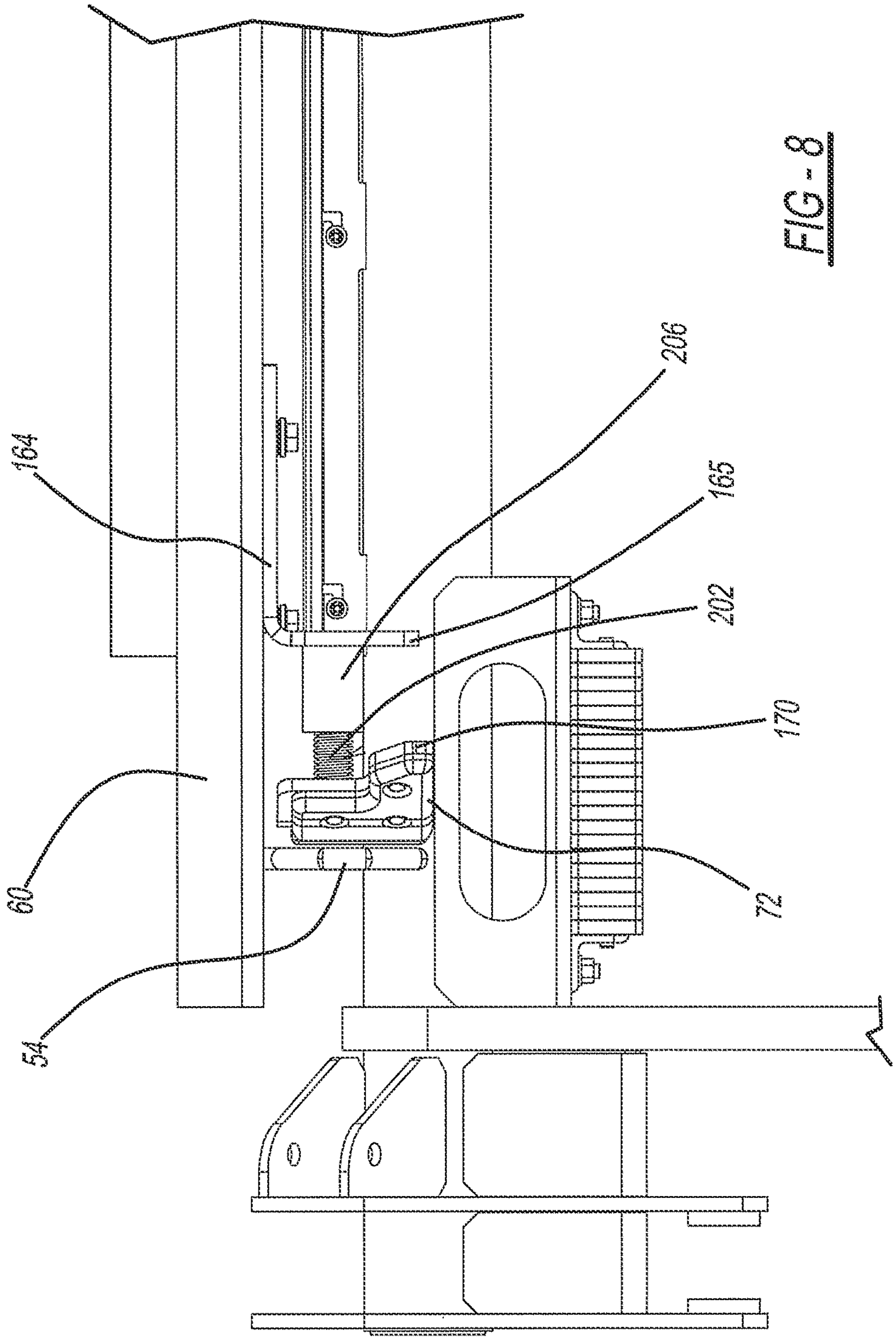
FIG. 8 is a top plan view of the cradle assembly of FIG. 6.

Turnings to FIGS. 6 through 8, an additional embodiment is shown. This embodiment is similar to the previous embodiment; however, a pair of spring members is illustrated.

The vertical portion 166 of the deflectable member 162 includes a pair of biasing springs 202, 204. A guide tube 206 is mounted onto the upturn portion 165 of the stationary member 164. Thus, the guide tube 206 enables the spring member 202, 204 to move within the guide tube 206. Thus, as force is applied to the vertical 166 or end portion 170 of the deflectable portion 162, it moves towards the stationary member 164. Again, the spring force returns the deflectable portion 162 against the guide member 54 to return the forks 20 to their original position.

Figure 9:
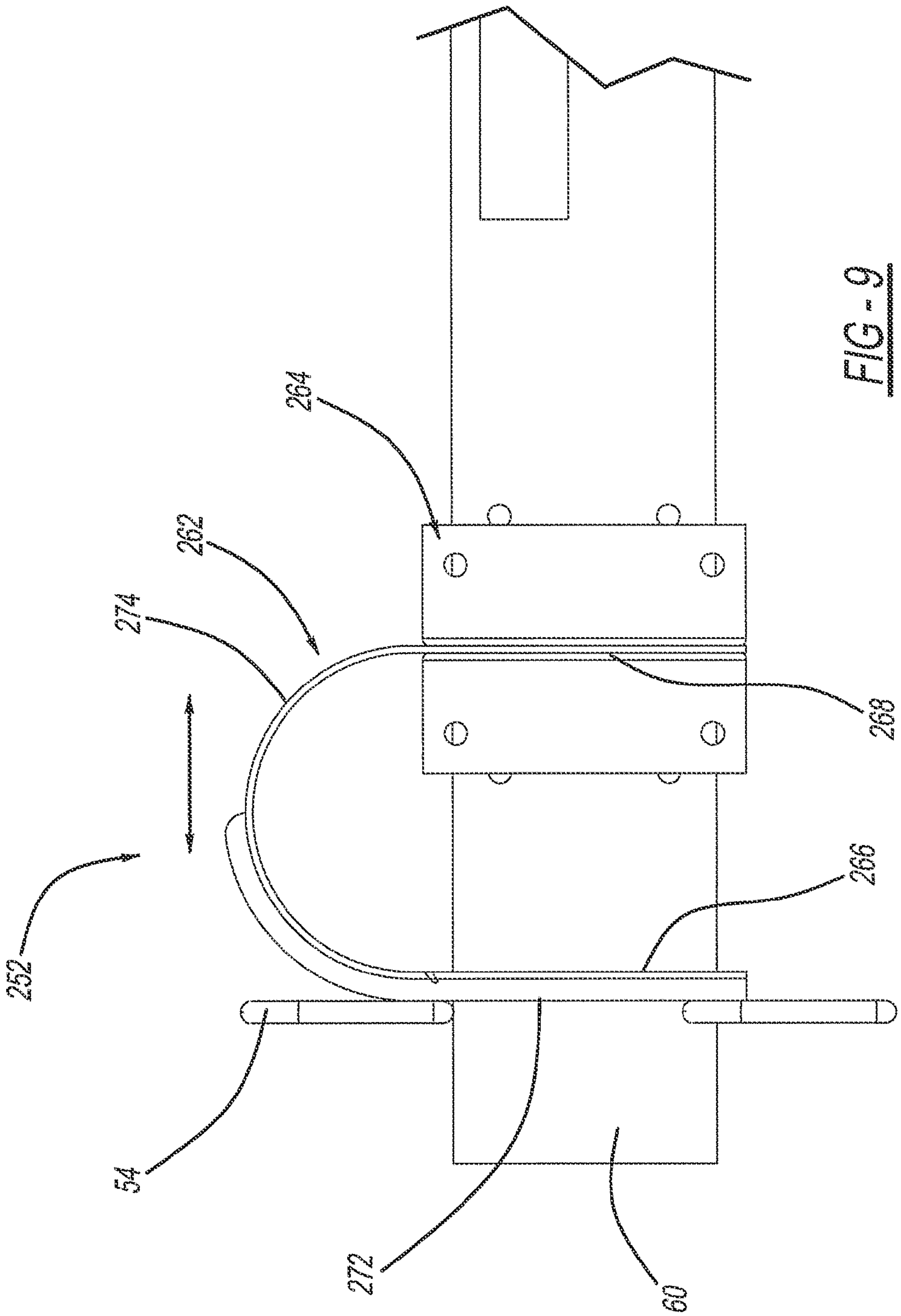
FIG. 9 is a front plan view of an additional embodiment of a cradle assembly.
Figure 10:
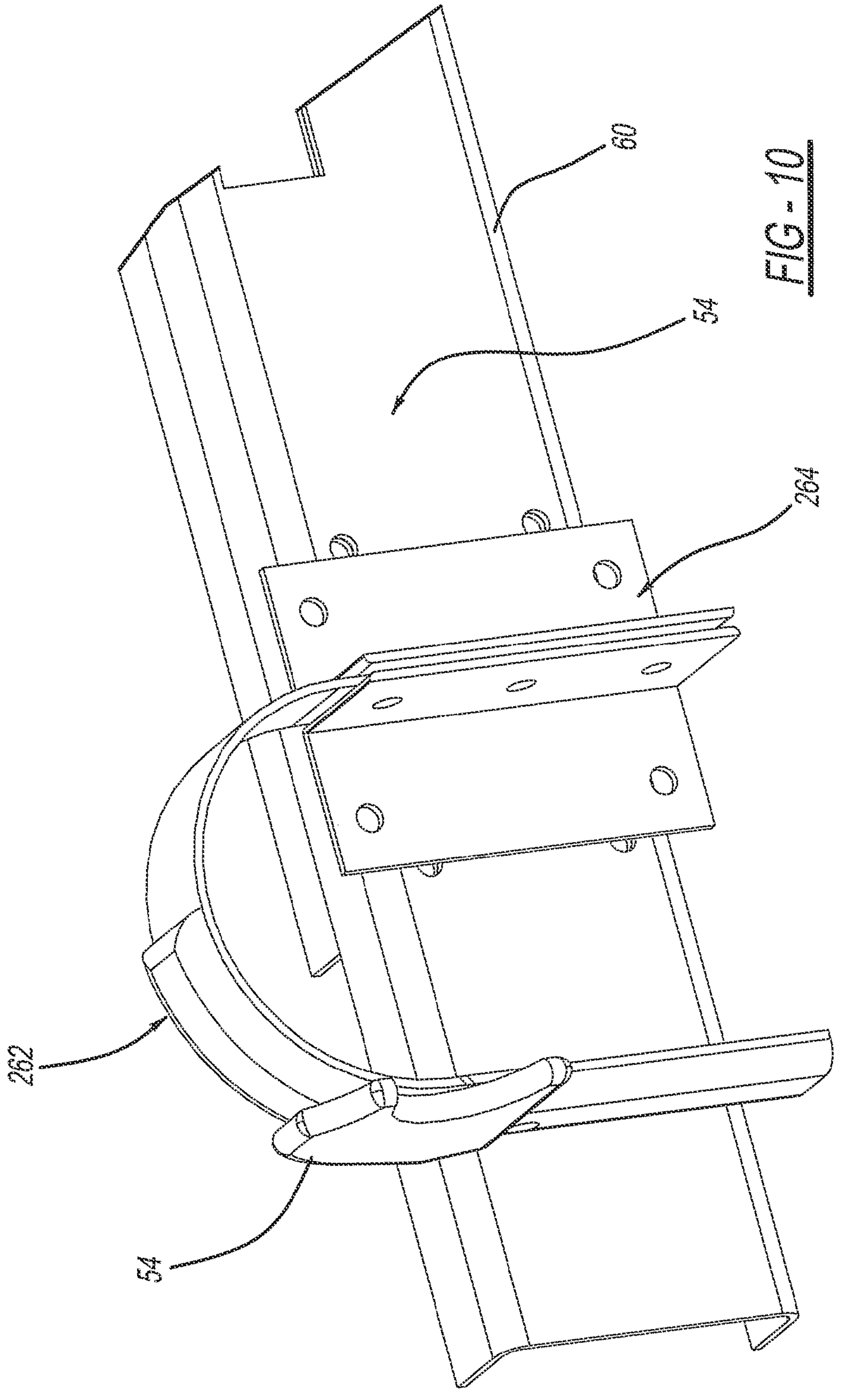
FIG. 10 is a perspective view of the cradle assembly of FIG. 9.

Turning to FIGS. 9-10, an additional embodiment is shown. Here, the deflectable portion 262 has an overall U-shape secured by a stationary member 264. Thus, the cradle 252 still deflects as in the previous embodiments. Here, the U-shape member 262 has one leg 268 secured in the stationary member 264. The leg 268 can be bolted or the like to the stationary member 264. Also, the other leg 266 of the U-shape deflectable member 262 has a wear plate 272 made from a nylontron material positioned on its outer side. The wear plate 272 or nylontron material extends approximately halfway across the web 274 of the U-shaped member. The U-shaped member is inverted 180°. Thus, the leg 266 acts as a deflection portion with a spring strength that applies a force to the guide member 54 to bias the guide member 54 which, in turn, maintains the forks 20 in their original position.

Figure 11:
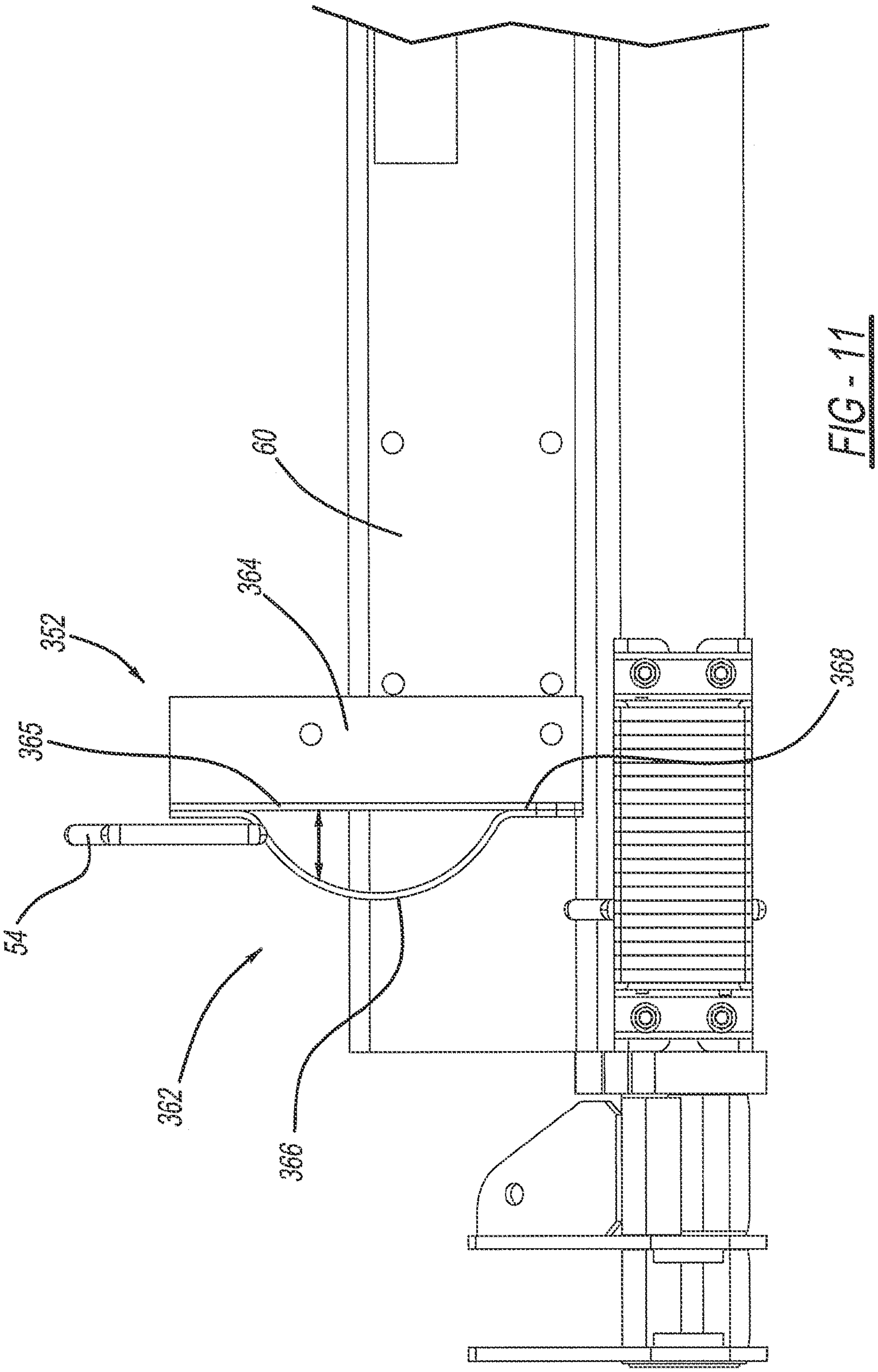
FIG. 11 is a front plan view of another embodiment of the cradle assembly.

Turning to FIG. 11, an additional embodiment is illustrated. Here, the cradle includes a stationary member 364 and a deflectable member 362. The deflectable member 362 is a U-shaped spring having upturned ends. One of the ends 368 is welded or the like to the stationary member 364. The U-shaped member is rotated approximately 90°. Thus, as the guide plate 54 comes into contact with the web portion 366, it pushes against the web portion 366 of the U-shaped member forcing it toward the stationary member 364. Again, the deflectable member 362 applies a force against the guide plate 54 to return the forks 20 to their original position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cradle system for a refuse vehicle defining a forward direction of travel on a ground surface, the cradle system comprising:

- at least one track fastened in a fixed position on a bumper of the refuse vehicle, the at least one track comprising:
  - a stationary plate, and
  - a deflectable plate, at least a portion of the deflectable plate and the stationary plate extending outward from the bumper in the forward direction;
- at least one guide mounted on a front-loading fork of the refuse vehicle, the at least one guide configured to engage the deflectable plate during misalignment of a front-loading fork relative to the refuse vehicle in a direction transverse to the forward direction of travel; and
- at least one spring secured to the stationary plate and aligned with the deflectable plate, the at least one spring configured to bias the deflectable plate against the at least one guide in the transverse direction.

2. The cradle system of claim 1, wherein the deflectable plate has a vertical leg and an angled end that is continuous with the vertical leg.

3. The cradle system of claim 2, wherein the at least one spring is secured proximate to an intersection of the vertical leg and the angled end.

4. The cradle system of claim 1, wherein the at least one track has a length extending transverse to the ground surface.

5. The cradle system of claim 4, wherein the at least one spring is angled with respect to the length of the at least one track.

6. The cradle system of claim 4, wherein the at least one spring is parallel with respect to the length of the at least one track.

7. The cradle system of claim 1, further comprising a wear pad on one of the at least one track or guide.

8. The cradle system of claim 1, wherein the at least one spring enables a deflection and return of the deflectable plate.

9. The cradle system of claim 1, wherein the deflectable plate of the at least one track is configured to deflect horizontally to compensate for the misalignment of the front-loading fork relative to the refuse vehicle.

10. The cradle system of claim 1, wherein the at least one track is configured to return to an undeflected position to align the front-loading fork.

11. The cradle system of claim 1, wherein the at least one guide is coupled to the front-loading fork and held fixed relative to the front-loading fork.

12. The cradle system of claim 1, wherein the at least one spring is positioned between the deflectable plate and the stationary plate.

13. The cradle system of claim 1, further comprising a pivot secured at a distal end of the deflectable plate, the pivot configured to enable the at least one track to deflect horizontally.

14. The cradle system of claim 1, wherein the at least one spring comprises a movable rod secured to the deflectable plate, and a cylinder secured to the stationary plate.

15. The cradle system of claim 1, wherein the stationary plate and the deflectable are parallel with respect to each other.

16. The cradle system of claim 1, comprising a pair of springs secured to the stationary plate and aligned with the deflectable plate, wherein the pair of springs is positioned between the stationary plate and the deflectable plate.

17. A refuse vehicle defining a forward direction of travel on a ground surface, the refuse vehicle comprising:

- a vehicle chassis including a cab;
- a container coupled within a rear portion of the chassis;
- front-loading forks coupled with the refuse vehicle for dumping intermediate containers into the container on the rear portion of the chassis;
- at least one track fastened in a fixed position on a bumper of the refuse vehicle, the at least one track comprising:
  - a stationary plate, and
  - a deflectable plate, at least a portion of the deflectable plate and the stationary plate extending outward from the bumper in the forward direction;
- at least one guide mounted on a front-loading fork of the refuse vehicle, the at least one guide configured to engage the deflectable plate during misalignment of a front-loading fork relative to the refuse vehicle in a direction transverse to the forward direction of travel; and
- at least one spring secured to the stationary plate and aligned with the deflectable plate, the at least one spring configured to bias the deflectable plate against the at least one guide in the transverse direction.

18. The refuse vehicle of claim 17, wherein the at least one track has a length extending transverse to the ground surface.

19. The refuse vehicle of claim 18, wherein the at least one spring is angled with respect to the length of the at least one track.

20. The refuse vehicle of claim 18, wherein the at least one spring is parallel with respect to the length of the at least one track.

21. The refuse vehicle of claim 17, wherein the at least one spring enables a deflection and return of the deflectable plate.

22. The refuse vehicle of claim 17, wherein the deflectable plate is configured to deflect horizontally to compensate for the misalignment of the front-loading fork relative to the refuse vehicle.

23. The refuse vehicle of claim 17, wherein the at least one guide is coupled to the front-loading fork and held fixed relative to the front-loading fork.

* * * * *